United States Patent

[11] 3,557,921

| [72] | Inventor | Nobuo Takada<br>Tokyo, Japan |
| --- | --- | --- |
| [21] | Appl. No. | 810,170 |
| [22] | Filed | Mar. 25, 1969 |
| [45] | Patented | Jan. 26, 1971 |
| [73] | Assignee | Koyo Seiko Company, Limited<br>Osaka, Japan |
| [32] | Priority | Mar. 29, 1968 |
| [33] | | Japan |
| [31] | | 43/20776 |

[54] ONE-WAY CLUTCH
5 Claims, 9 Drawing Figs.

| [52] | U.S. Cl. | 192/45 |
| --- | --- | --- |
| [51] | Int. Cl. | F16d 41/07 |
| [50] | Field of Search | 192/45 |

[56] References Cited
UNITED STATES PATENTS

| 1,670,197 | 5/1928 | Humfrey | 192/45 |
| --- | --- | --- | --- |
| 1,834,843 | 12/1931 | Humfrey | 192/45 |
| 3,403,762 | 10/1968 | Auriol | 192/45 |

*Primary Examiner*—Allan D. Herrmann
*Attorney*—Mason, Fenwick & Lawrence

ABSTRACT: A one-way clutch performs free running and serves as an antifriction bearing while inner or outer race formed in the shape of a taper roller bearing is being driven in a positive direction. Between the inner and outer races are interposed rollers which are appropriately inclined with respect to the generating line of both of the race surfaces. When either one of the races is about to rotate in the opposite direction, the rollers act as wedges between the races to effect clutch action.

PATENTED JAN 26 1971

*Inventor*
NOBUO TAKADA
By
Mason, Fenwick & Lawrence
*Attorneys*

Inventor
NOBUO TAKADA
By
Mason, Fenwick & Lawrence
Attorneys

ONE-WAY CLUTCH

The present invention relates to a one-way clutch and more particularly to a free running clutch of antifriction bearing type which is called "one-way clutch."

A conventionally known clutch of this type has between inner and outer races cylindrical sprags which are partly deformed in the circumferential surface. While the inner or outer race is being rotated in the positive direction, the surface of sprags interposed between the race surfaces are kept in sliding contact with the surfaces of inner and outer races (generally with inner race surface), and when the inner or outer race is about to rotate in the opposite direction, namely in negative direction, part of the above-mentioned deformed surface is brought into clutching engagement with the surface of inner or outer race. The most serious defect of such a one-way clutch is that during the above-mentioned idle rotation the sprag surface comes into kicking contact with inner and outer race surfaces and when the outer and inner races are actuated into clutching action the wedging surfaces of sprags are forced to wedge into the race surface, thereby causing wear on the surfaces of sprags or on inner and outer races to impair the function of the one-way clutch. Furthermore, in order to ensure the clutching action and smooth idle rotation, there is a need to retain the sprags in a definite position so that springs are provided, for instance, between the sprags and the outer race or a retainer. With this structure however there arise difficulties that the springs or retainer is subjected to possible breakage, the clutch structure becomes complex and process to grind the sprags requires special jigs and tools.

An object of the present invention is to achieve almost perfect elimination of sliding friction which may otherwise be produced between the sprags and inner and outer race surfaces by forming sprags in the shape of simple cylindrical rollers.

Another object of the present invention is to provide a one-way clutch in which the wear on inner and outer race surfaces is markedly reduced by eliminating nearly all of the above-mentioned sliding friction and which is compact in structure and is in itself capable of serving as an antifriction bearing during idle rotation, thus overcoming a conventionally experienced inconvenience that the one-way clutch must always be employed together with antifriction bearing.

The one-way clutch of the present invention comprises inner and outer races formed in the shape of conical roller bearing and rollers in the shape of cylinder, truncated cone, arcuate-surfaced roller, hyperboloidal rolling body or the like which are disposed between the inner and outer races, with the axes thereof inclined at an appropriate angle with the generating line of inner and outer race surfaces.

In accordance with the present invention, the sprags serve as rolling members of an antifriction bearing during idle rotation of the clutch and it is no longer necessary to provide a conventional means for retaining the sprags in a definite position, hence the advantage that the structure can be simplified.

Furthermore, since sprags in accordance with the present invention are perfectly kept in line contact with the inner and outer race surfaces over the entire length, the clutch has a greater capacity to assume bearing loads while serving as a bearing than a conventional one-way clutch, with sufficient torque capacity when serving as a clutch.

Other features and advantages of the present invention will become apparent from the following description of embodiments with reference to the accompanying drawings, in which.

Referring to FIGS. 1 to 5, numeral 1 designates an inner race; 2, an outer race; 1a and 2a, race surfaces respectively formed on the inner race and outer race; 3, rollers; 4, a flange serving as a stop member and formed along the periphery of the larger diameter end portion of inner race; 5, a cage provided between the inner race and outer race for retaining the rollers; and 6, openings formed in the cage for retaining the rollers.

Figure 1:
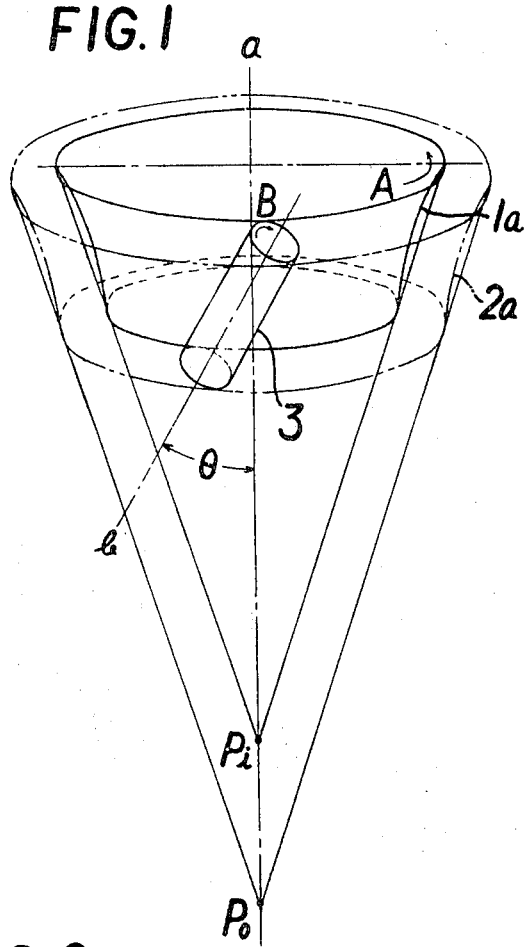
FIG. 1 is a schematic perspective view illustrating the fundamental principle of the invention and showing the shape of inner and outer race surfaces and a roller in fitting contact therewith.
Figure 2:
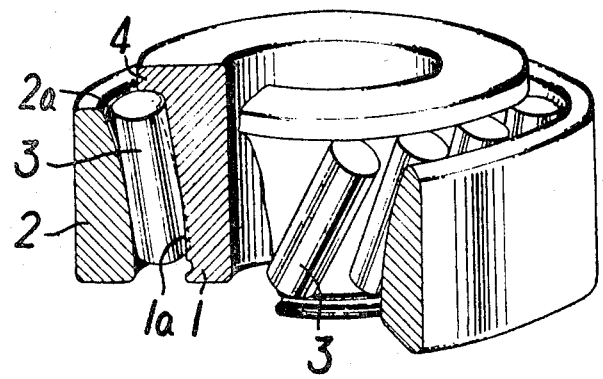
FIG. 2 is a perspective view partly broken away and showing an example embodying the principle in FIG. 1.

Cylindrical rollers 3 are disposed between race surfaces 1a and 2a of the respective inner race 1 and outer race 2 which are formed in the shape of conical roller bearings. The axis $b$ of the roller 3 is inclined at an appropriate angle $\theta$ with the generating lines $a$ which form the race surfaces of the inner race 1 and outer race 2 in the shape of conical roller bearings. One end of the roller 3 is kept in contact with the guide surface of flange 4 provided along the periphery of the larger diameter end portion of the inner race 1. On the other hand, since the inner and outer race surfaces 1a and 2a dispose therebetween the cylindrical rollers 3 which are inclined with respect to the generating line $a$ of the race surfaces, the inner and outer race surfaces 1a and 2a are, in accordance of the angle $\theta$ of inclination of rollers 3, with hyperboloidal curvature as shown in FIGS. 1 and 2 so as to effect line contact with the rollers 3 over the entire length thereof. The curvature of the hyperboloidal surfaces depends upon the inclination angle $\theta$, vertical angle of the generating line of the race surfaces of inner and outer races 1 and 2, shape of the rollers, diameters of the inner and outer races, etc. The above-mentioned contact serves to enhance the torque capacity of the one-way clutch as well as its load capacity as an antifriction bearing. Such contact is also useful in keeping the rollers in a definite rolling position all the time.

Figure 3:
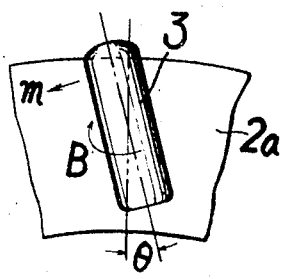
FIGS. 3 and 4 are developments for the explanation of function of the present invention, FIG. 3 showing the direction of movement of the roller on the outer race surface, FIG. 4 showing the direction of movement of the roller on the inner race surface.
Figure 4:
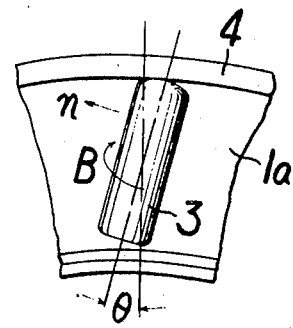

Now, when the inner race 1 is rotated in a direction of the arrow A as shown in FIG. 1, the roller 3 tends to rotate in a direction indicated by the arrow B. Suppose the roller 3 rotates in the direction of arrow B, the roller 3 rolls, with respect to the race surface of inner race 1, in a direction away from vertex $Pi$ of the cone formed by generating line of the race surface, while with respect to the outer race surface 2a, it rolls in a direction towards the vertex $Po$ of the cone formed by the race surface generating line. Referring to FIGS. 3 and 4 for more detailed explanation (FIG. 3 is a development of the outer race surface as seen from diametrically inner side and FIG. 4 a development of the inner race surface as seen from diametrically outer side), it will be seen that when the torque is applied on the roller 3 in a direction of arrow B, it tends to move in a direction of arrow $m$ on the outer race surface 2a, whereas it tends to move in a direction of arrow $n$ on the inner race surface 1a. However, since the inner race 1 has a projecting stop member 4 along the periphery of the race surface 1a at the end of the larger diameter, with the end surface of roller 3 in contact with the stop member 4, the end surface of roller 3 is pressed against the stop member 4 by the above-mentioned torque and frictional force acting between the circumferential surface of the roller and the inner race surface 1a, so that the roller is prevented from rolling on the inner race surface 1a with the result that the roller 3 and inner race 1 act as if they were a unitary member. On the other hand, the outer race 2 which has no flange allows the roller 3 to move on the race surface 2a in the direction of arrow $m$, and as a result, in case the vertical angle of the generating line of outer race surface 2a is smaller than the angle of sliding friction between the outer race surface 2a and roller 3, the outer race surface 2a is acted on as if by a wedge. Therefore, through the rotation of the inner race 1 the roller 3 which is prevented from rolling by the stop member 4 on the inner race 1 is driven onto the outer race surface 2a towards the side of the smaller diameter, whereby a wedging action is exerted thereon. That is, a great clamping force of the outer race 2 due to this wedging action produces high frictional force between the circumferential surface of roller 3 and respective race surfaces 1a and 2a thus causing the outer race 2 to rotate integrally with the inner race 1.

Figure 5:
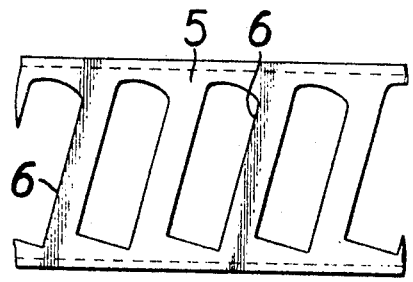
FIG. 5 is a development showing an embodiment of a cage provided between the inner race and outer race for retaining the rollers.

It will be apparent from the above description that when the inner race is turned in the direction opposite to that of arrow A, the roller 3 is rolled on the inner race surface 1a in a direction toward the vertex P$i$ of the cone and, on the outer race surface 2a, in a direction away from the vertex p$o$ of the cone, so that the above-mentioned rotation of the roller 3, in case it is retained by the cage 5 such as shown in FIG. 5, produces between the roller and inner race surface 1a a frictional force which acts in such a direction that the inner race 1 may be moved away from the vertex P$i$ of the cone formed by its race surface generating line, while producing between the roller and outer race surface 2a a frictional force which serves to move the outer race 2 toward the vertex P$o$ of cone formed by the race surface generating line. As a result, the roller 3 rolls forward while causing slight slippage relative to the inner and outer surfaces 1a and 2a, thus performing a function as an antifriction bearing similar to an ordinary conical roller bearing.

The above-mentioned cage 5 may be made by a desired method as by punching with a press, boring, molding, etc. Since the sliding friction produced during the rolling movement of rollers is extremely small, a retainer made by a very simple punching operation with press may be employed without impairing its function.

Figure 6:
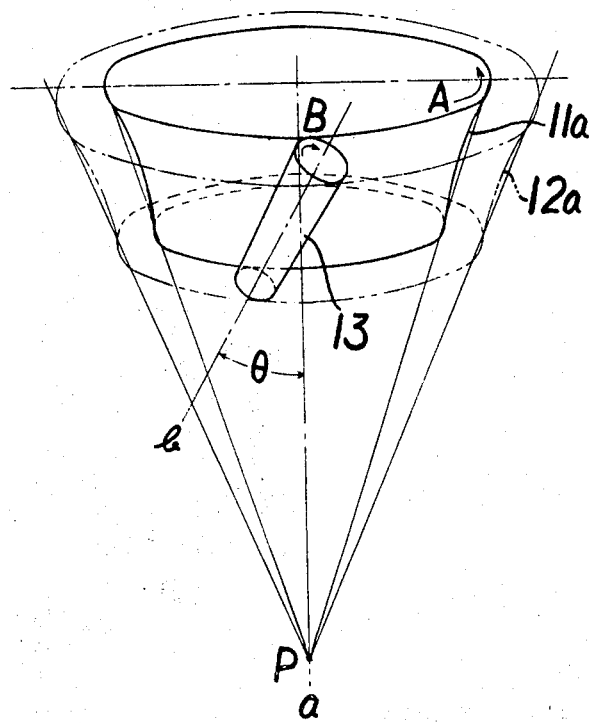
FIG. 6 is a schematic perspective view similar to FIG. 1 with a roller formed in the shape of a truncated cone.
Figure 7:
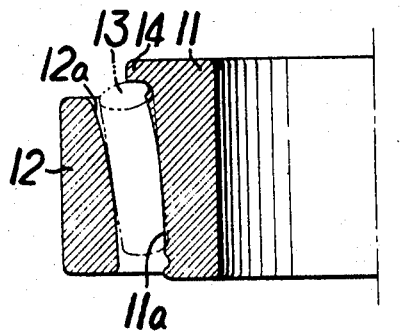
FIG. 7 is a view in vertical section of an embodiment of FIG. 6.

FIGS. 6 and 7 illustrate an embodiment in which rollers 13 formed in the shape of truncated cone are used. The fundamental structure of this embodiment is the same as that in FIG. 1. Since the rollers 13 are of truncated conical shape in this case, the vertexes of the respective cones formed by the race surface generating lines of inner race 11 and outer race 12 coincide at a point P. Just as in the embodiment in FIGS. 1 to 5, each of inner and outer race surfaces 11a and 12a has a hyperboloidal surface and a stop member 14 is provided at the diametrically larger end of the inner race surface 11a. In serving as one-way clutch and antifriction bearing, this embodiment also has the same functions as that in FIGS. 1 to 5.

Figure 8:
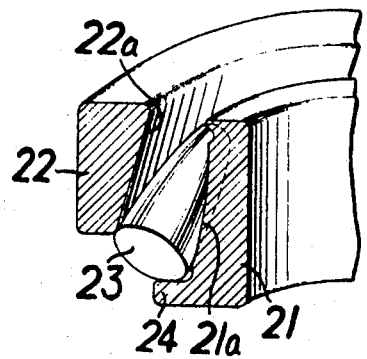
FIG. 8 is a perspective view partly in section showing a case in which the roller has a surface of arcuate contour.

Illustrated in FIG. 8 is an embodiment in which the circumferential surface of roller 23 is formed as an arcuate-surfaced roller, wherein the surface contour is generated by rotating a circular arc about a longitudinal axis. With this construction, race surface 21a of an inner race 21 is formed with a hyperboloidal surface as shown, whereas the race surface 22a of an outer race 22 may be formed with a conical surface. The outer race can therefore be manufactured by exactly the same method as the outer race of spherical conical roller bearings of a common type. The inner race 21 is provided with a stop member 24 at the end having the larger diameter.

Figure 9:
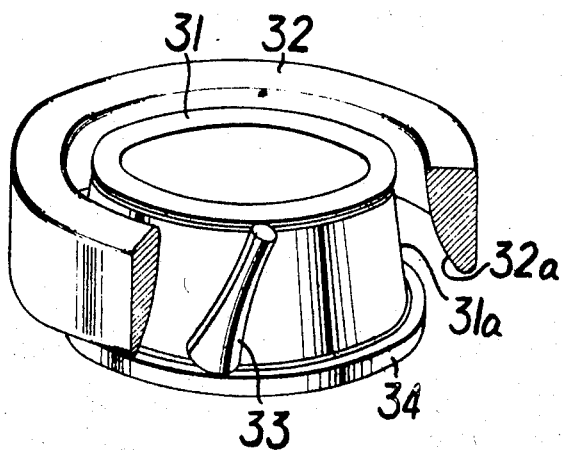
FIG. 9 is a perspective view partly in section showing an embodiment with a roller having a hyperboloidal surface.

FIG. 9 shows an embodiment comprising rollers 33 in the form of hyperboloidal roller. In accordance with this structure, the race surface 32a of outer race 32 may be formed with hyperboloidal surface, while the surface 31a of inner race 31 can be formed with a conical surface so that the inner race may be manufactured by precisely the same method as the inner race of an ordinary conical roller bearing. Numeral 34 designates a flange.

FIGS. 8 and 9 show embodiments each having rollers which are different in shape from those shown in FIGS. 1 to 5 and accordingly the race surfaces of these embodiments have modified contours. In principle, however, they are quite the same as that shown in FIG. 1 with respect to structure as well as to function.

In accordance with each of the embodiments described above, both of the inner and outer race surfaces or one of these surfaces and the circumferential surface of rollers are formed with hyperboloidal surface and as a result the rollers, when assembled in place, are inclined at a predetermined inclination angle $\theta$ by being restricted by the hyperboloid. When the clutch serves as an antifriction bearing, therefore, the rollers do not exert high sidewise pressure. The cage itself may be formed by such a simple method as by punching with a press.

In the foregoing description of the embodiments, the stop member for restricting the rolling of rollers is provided at the diametrically larger end of the inner race, but since the stop member serves to prevent the rolling of rollers when the inner race or outer race rotates in one direction, it may also be disposed at one portion other than the above-mentioned larger diameter end portion of the inner race such as at the end of diametrically smaller end of inner race, diametrically smaller or larger end of the outer race. Instead of forming the stop member integrally with the inner or outer race, it may also be provided as a separate member to be joined therewith. The one-way clutch thus built can be mounted in moving portion of machine in precisely the same manner as an ordinary single or double row conical roller bearing.

I claim:

1. A one-way clutch comprising inner and outer races formed in the shape of a conical roller bearing, rollers disposed between the race surfaces of said races with axes inclined at an appropriate angle with the generating line of the race surfaces over the entire length, and a stop member provided at any one of the end portions of said inner and outer race surfaces so that when said clutch is actuated one end surface of said rollers may be brought into contact therewith to prevent the rolling of said rollers, the rollers being formed in the shape of truncated cones and both of the race surfaces of said inner and outer races are of hyperboloidal contour.

2. A one-way clutch comprising inner and outer races formed in the shape of a conical roller bearing, rollers disposed between the race surfaces of said races with axes inclined at an appropriate angle with the generating line of the race surfaces over the entire length, and a stop member provided at any one of the end portions of said inner and outer race surfaces so that when said clutch is actuated one end surface of said rollers may be brought into contact therewith to prevent the rolling of said rollers, the roller surfaces being arcuate from end to end and both of the race surfaces of said inner and outer races are so formed as to be in line contact with the entire length of said rollers.

3. A one-way clutch comprising inner and outer races formed in the shape of a conical roller bearing, rollers disposed between the race surfaces of said races with axes inclined at an appropriate angle with the generating line of the race surfaces over the entire length, and a stop member provided at any one of the end portions of said inner and outer race surfaces so that when said clutch is actuated one end surface of said rollers may be brought into contact therewith to prevent the rolling of said rollers, the roller surfaces being arcuate from end to end and the outer race has a conical surface.

4. A one-way clutch comprising inner and outer races formed in the shape of a conical roller bearing, rollers disposed between the race surfaces of said races with axes inclined at an appropriate angle with the generating line of the race surfaces over the entire length, and a stop member provided at any one of the end portions of said inner and outer race surfaces so that when said clutch is actuated one end surface of said rollers may be brought into contact therewith to prevent the rolling of said rollers, the rollers having hyperboloidal surfaces.

5. A one-way clutch as claimed in claim 4 wherein, the inner race has a conical surface.